Nov. 29, 1960  P. A. MEDEARIS  2,962,114
OIL WELL DRILLING MUD DEGASSING EQUIPMENT
Filed Sept. 9, 1957

PAUL A. MEDEARIS,
INVENTOR.

WHANN & McMANIGAL
Attorneys for Applicant

United States Patent Office 2,962,114
Patented Nov. 29, 1960

2,962,114
OIL WELL DRILLING MUD DEGASSING EQUIPMENT

Paul A. Medearis, Los Angeles, Calif.
(P.O. Box 449, Torrance, Calif.)

Filed Sept. 9, 1957, Ser. No. 682,820

3 Claims. (Cl. 183—2.5)

This invention relates to improvements in connection with the handling and treatment of drilling mud used in oil well drilling operations and more particularly the invention involves a system and apparatus for degassing the drilling mud, i.e., removing the entrained gases from the drilling mud, whereby to improve the efficiency and economy of the drilling operation.

In the drilling of oil wells, it is standard practice to circulate drilling mud in the well during drilling operations. The drilling mud is pumped by slush pumps and delivered downwardly through the drill pipe into the lower end of the well and out through openings in the drill bit. The drilling mud then flows upwardly through the well around the drill pipe to the surface, carrying upwardly with it the drill cuttings and serving the purpose, also, of supporting the uncased walls of the well and providing the necessary weight to prevent blowouts. The drilling mud is a liquid mixture containing additives to give it the appropriate specific gravity to serve its purpose and particularly that the column of drilling mud will have the necessary weight, as pointed out, to prevent blowouts of pressure accumulating in the lower part of the well.

During operations it frequently happens that gas becomes entrapped or entrained in the drilling mud, as a result of drilling through gas pockets in the earth. This reduces the specific gravity of the drilling mud to such an extent that the mud does not have enough weight to serve its purpose of preventing blowouts.

Blowouts are definitely a serious hazard in connection with the drilling of oil wells, which actually call for precautions which a great part of the time are not taken. There have recently, in fact, been occasions of blowouts in connection with well drilling operations wherein the gas caught fire after blowout, causing serious injury to personnel and damage to property. The quality of the drilling mud particularly as to its specific gravity normally will vary during operations, dependent upon, among other things, the type of earth formation which is being drilled through. It is possible, of course, that some type of earth formations may improve the quality of the drilling mud but, of course, there are many formations which will result in the quality of the mud deteriorating to the point where the hazard of a blowout is definitely present. Ordinarily, during drilling operations materials are added to the drilling mud to preserve its specific gravity, these materials being certain bulk materials, such as bentonite, clays, dry Bariod chemicals, etc.; however, the hazard is always present that gases may become entrained in the drilling mud to a sufficient extent that its specific gravity is not sufficient to prevent a blowout in the event of a sufficient accumulation of pressure in the well. It is possible that such a situation may develop even with the most careful and efficient of operators, but obviously if there is any negligence or carelessness on the part of operators the quality of the drilling mud may very easily deteriorate to the point where the hazard of a blowout is very definitely present. It can be seen, therefore, that possibility of a blowout and the high probability of an attendant fire are a hazard in connection with oil well drilling operations which ordinarily is not adequately protected against. My invention provides a simple, practical but effective safeguard which automatically and efficiently conditions the drilling mud to avoid and prevent the specific gravity of the mud being lost due to the presence of entrained gases therein, and it therefore provides a major safeguard against the contingency of a blowout. The invention is a significant safety device on the basis of its contribution to reduction of the particular hazard of blowouts. The equipment of this invention can be added to or installed in existing system; after being started in operation the equipment operates without attention, while positively maintaining improved conditions as to safety by removing entrained gases from the drilling mud, if such entrained gases are present. Thus, the overall safety factor is significantly improved at very low initial expense, practically negligible maintenance, and without the need of the attention of operators. In fact, an important advantage of the invention is that its use will offset to a considerable degree any negligence or carelessness on the part of operators in the matter of safety as respects blowouts.

It is a primary object of this invention to provide apparatus for removing the entrained or entrapped gases from drilling mud, thus restoring the mud to its original specific gravity, i.e., the device may be called a "degasser" or "degasifier."

It is a further object of the invention to provide such an apparatus connected in continuous circulation in a system supplying drilling mud to an oil well.

It is a further object of the invention to provide a degasser for oil well drilling mud comprising a tank having means for admitting the drilling mud to the lower part thereof; means for violently agitating and turbulating the mud to release the gases therefrom comprising oppositely disposed impellers having oppositely pitched blades and exhaust means for withdrawing released gases from the upper part of the tank.

Another object of the invention is to provide a gas releasing or degassing apparatus comprising a tank having therein a pair of oppositely disposed impellers having oppositely pitched blades arranged so that the impellers direct a circulation of liquid towards each other whereby to create violent agitation and turbulation whereby to cause entrained gases to be released from the mixture.

Another object is to provide an apparatus as in the foregoing object wherein the tank has oppositely disposed inlets in a downwardly extending flume at an intermediate part of the tank with impellers arranged in the inlets to circulate liquid inwardly and an impeller with oppositely pitched blades opposite each inlet impeller.

Further objects and numerous advantages of the invention will become apparent from the following detailed description and annexed drawings wherein.

Figure 1:
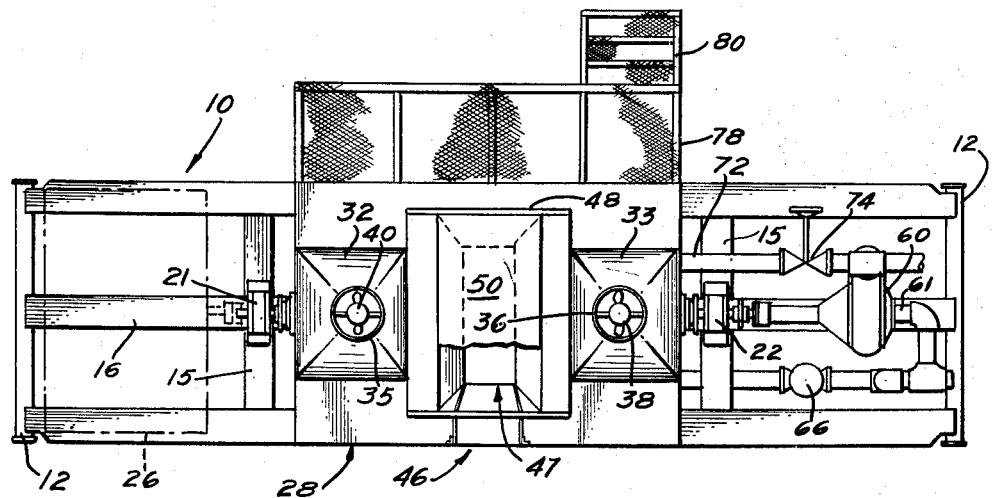
Fig. 1 is a plan view of a preferred form of degassing apparatus in accordance with my invention.

Referring now more in detail to the drawings, the apparatus is skid-mounted on a skid frame indicated generally at 10, having skids as shown at 11 which are connected to transverse, cylindrical beams or members 12 at the ends of the skid frame. The frame has transverse members 15 and a longitudinal central member 16. Upstanding from the skid frame are pillow block standards 17 and 18 and journalled in the pillow blocks 21 and 22 is a shaft 25 extending centrally and longitudinally of the skid frame. This shaft is driven by a prime mover 26 mounted on the left end of the skid frame, and this may be any type of engine, such as an internal combustion engine or an electric motor or the like.

Figure 2:
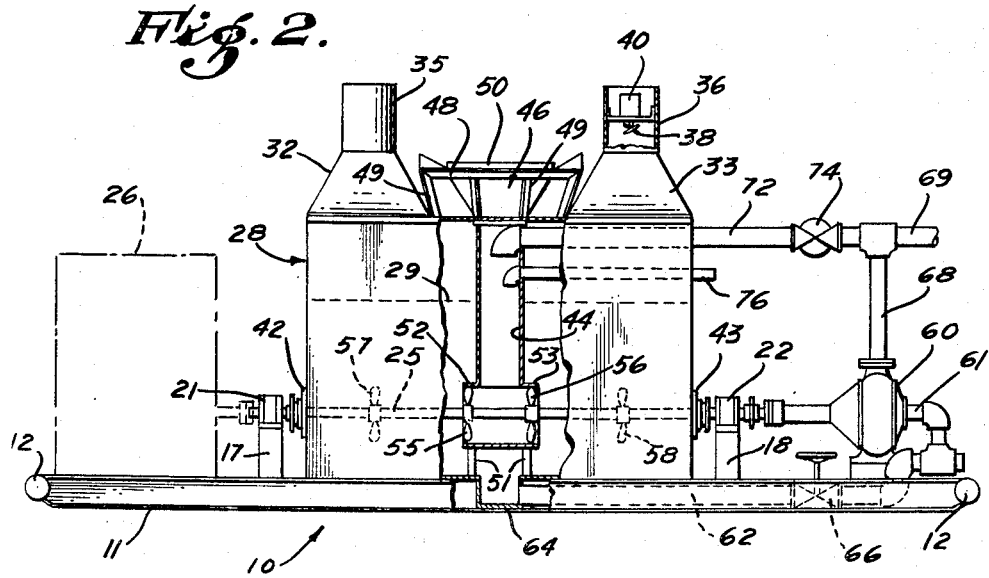
Fig. 2 is a side elevational view, partly in section, of the apparatus of Fig. 1.

The shaft 25 extends through the lower part of the degassing tank, indicated generally at 28, mounted on the skid frame. The drilling mud is degassed in this tank. The tank has a pair of hoods at the upper part which taper inwardly, as shown at 32 and 33, and these hoods, or covers, are fitted to the tank in sealing engagement therewith so that a vacuum may be drawn inside the hoods and in the upper part of the tank. At the upper end of each of the covers, or hoods 32 and 33, is a stack as indicated at 35 and 36. In each of these stacks there is mounted an exhaust fan, as indicated diagrammatically in Fig. 2, at 38, these exhaust fans being power driven, such as by an electric motor as indicated at 40. As will be pointed out, the gas, which is released from the drilling mud, rises to the upper part of the tank and vacuum may be drawn therein for withdrawing and discharging the gases through the stacks. The drilling mud level in the tank is indicated at 29.

The shaft 25 is sealed at the point it extends through the outer side walls of the tank 28, these seals being indicated at 42 and 43 and being of a type known in the art and which are therefore not shown or described in detail.

In the central part of the tank there is a flume of rectangular cross section, as shown at 44, for the incoming drilling mud. The drilling mud is supplied from a ditch, trough, or channel 46, which leads directly from the oil well and which connects with a hopper, as indicated at 47, which feeds into the flume or channel 44. The flume 44 rests on supporting legs 51. The hopper 47 has inwardly tapering side walls, as shown in Fig. 1, and is supported by a rectangular frame 48 having corner legs, as shown at 49. The hopper 47 has a sealed removable cover 50.

The flume 44 has circular flanged inlet openings at the lower part thereof, as shown at 52 and 53, these inlets communicating with the tank 28. The shaft 25 is coaxially aligned with these inlet openings and disposed in the inlets are rotary impellers as indicated at 55 and 56. These impellers circuate the drilling mud and drive it inwardly from the openings 52 and 53. Mounted on the shaft 25 in the interior of the tank 28 is a second impeller 57 which is oppositely disposed to the impeller 55 and which has oppositely pitched blades so as to circulate drilling mud towards the other impeller 55. These impellers are on the same shaft and their effect is to violently agitate and turbulate the drilling mud between and in the region of the impellers whereby the entrained gases are released from the mud and allowed to rise upwardly to the upper part of the tank. In the tank 28 is another impeller 58 corresponding to and disposed similarly to the impeller 57. Impellers 56 and 58 create agitation and turbulence between them, as described in connection with impellers 55 and 57, causing entrained gases to be released and to rise to the upper part of the tank above the drilling mud level. The exhaust fans, as indicated at 38 in the stacks or upper part of the tank, are able to draw a vacuum within the hoods, or covers, i.e., in the upper part of the tank, and the accumulated gases are exhausted and drawn off by the exhaust fans.

The hopper 46 and the flume 44 are sealed with respect to adjacent portions of tank 28 to prevent air being drawn into the tank. Operation of the impellers pulls the level of mud in flume 44 below that in the tank 28.

Also mounted on one end of the shaft 25 is a circulating pump 60 which takes a suction on a connecting pipe 61 which is connected through joints, as shown, to a pipe 62 connected to a well 64 formed at the lower part of the tank 28 between cross beams of the skid frame. Degassed drilling mud flows into well 64 and is withdrawn by the pump 60. Numeral 66 designates a manual control valve in the pipe 62. The pump 60 discharges through a pipe 68 and the degassed drilling mud may be circulated to the oil well through a pipe 69. The drilling mud may also be recirculated through the degassing equipment through a pipe 72 having in it a manual shut-off valve 74. Numeral 76 designates a pipe whereby water, chemicals or additives may be fed into the circulating mud, this pipe being directed into the channel 44 between the tanks.

Numeral 78 designates a platform or catwalk of steel grill work at one side of the apparatus with mounting stairs 80.

From the foregoing it will be observed that the above described equipment constitutes a system for continuously degassing drilling mud which is being circulated through an oil well. The apparatus embodying the oppositely disclosed and oppositely pitched impellers agitates and turbulates the drilling mud for releasing the gases with maximum effectiveness. The efficiency and economy of the drilling operations are thereby considerably enhanced, particularly in that the efficiency of the drilling mud is maintained and economies are otherwise effected in its utilization.

The foregoing disclosure is representative of a preferred form of my invention and is to be interpreted in an illustrative rather than a limiting sense. Various modifications and alternatives in the invention may be adopted by those skilled in the art, and it is to be understood that the scope of the invention is to be in accordance with the claims appended hereto.

I claim:

1. In an oil well drilling mud degassing equipment, in combination: means comprising a degassing tank; means forming a downwardly extending inlet conduit at a central part of the tank; means forming oppositely disposed drilling mud inlets at the lower part of said conduit; means for conveying drilling mud to said inlet conduit; means comprising a shaft having mounted thereon a rotary impeller disposed in each of said inlets; means for driving said shaft; additional rotary impellers mounted on said shaft in said tank spaced from said inlet impellers and each having blades oppositely pitched to its respective inlet impeller for agitating and turbulating the drilling mud in the tank; a pair of hood and exhaust stacks at the upper part of the tank, said hoods and stacks being disposed on opposite sides of said inlet conduit; means comprising an exhaust fan in each of said stacks for drawing off gases released as a result of agitation of the drilling mud in the tank; a suction pump connected to said shaft for withdrawing degassed drilling mud from the lower part of the tank; and recirculating means whereby drilling mud discharged from the pump may be recirculated through the degassing equipment.

2. In an oil well drilling mud degassing equipment, in combination: means comprising a degassing tank; means forming a centrally disposed inlet conduit for oil well drilling mud in the tank; means forming oppositely disposed drilling mud inlets at the lower part of said conduit; means comprising a power driven shaft extending through the tank and having mounted thereon a rotary impeller in each of said inlets; additional rotary impellers mounted on said shaft spaced from said inlet impellers and each having blades oppositely pitched to its respective inlet impeller for agitating and turbulating the drilling mud in the tanks; a pair of spaced, sealed hoods and exhaust stacks at the upper part of the tank, said hoods and stacks being disposed over said additional impellers; means comprising an exhaust fan in each of said stacks for drawing off gases released as a result of agitation of the drilling mud in the tanks; a suction pump mounted on said shaft for withdrawing degassed drilling mud from the lower part of the tanks; and a discharge conduit from said pump.

3. In an oil well drilling mud degassing equipment, in combination: means comprising a degassing tank; inlet means comprising a conduit at an intermediate position in the tank having oppositely disposed drilling mud inlet openings near the lower part of the tank; a power driven shaft extending through the tank coaxially aligned with said inlet openings; a rotary impeller mounted on said shaft in each of said inlet openings; a third rotary impeller on said shaft spaced from one of said inlet impellers and having blades oppositely pitched thereto; a fourth rotary impeller mounted on said shaft and spaced from the other inlet impeller and having blades oppositely pitched thereto whereby violent agitation and turbulence is created between and in the region of the two sets of impellers for releasing entrained gases from the drilling mud; and means forming a sealed space above the level of the drilling mud in the tank adapted to have a suction taken thereon for withdrawing released gases.

References Cited in the file of this patent

UNITED STATES PATENTS

| | | |
|---|---|---|
| 2,153,537 | Heath et al. | Apr. 11, 1939 |
| 2,635,859 | Dreyfus | Apr. 21, 1953 |
| 2,660,259 | Morehouse | Nov. 24, 1953 |
| 2,704,658 | Gordon | Mar. 22, 1955 |